United States Patent
Ahn et al.

(10) Patent No.: US 9,801,209 B2
(45) Date of Patent: Oct. 24, 2017

(54) METHOD FOR TRANSMITTING RANDOM ACCESS PREAMBLE, AND WIRELESS DEVICE

(71) Applicant: LG ELECTRONICS INC., Seoul (KR)

(72) Inventors: Joonkui Ahn, Anyang-si (KR); Suckchel Yang, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 99 days.

(21) Appl. No.: 14/399,836

(22) PCT Filed: May 9, 2013

(86) PCT No.: PCT/KR2013/004087
§ 371 (c)(1),
(2) Date: Nov. 7, 2014

(87) PCT Pub. No.: WO2013/169034
PCT Pub. Date: Nov. 14, 2013

(65) Prior Publication Data
US 2015/0163830 A1    Jun. 11, 2015

Related U.S. Application Data

(60) Provisional application No. 61/645,026, filed on May 9, 2012.

(51) Int. Cl.
*H04W 74/08* (2009.01)
*H04L 5/14* (2006.01)
(Continued)

(52) U.S. Cl.
CPC .......... *H04W 74/0833* (2013.01); *H04L 5/14* (2013.01); *H04W 74/004* (2013.01);
(Continued)

(58) Field of Classification Search
CPC ... H04B 1/56; H04B 7/2656; H04W 72/0446; H04W 88/08; H04W 76/02
See application file for complete search history.

(56) References Cited

U.S. PATENT DOCUMENTS 8,243,634 B2 * 8/2012 Haartsen ............. H04B 7/2681
                                                     370/280
8,391,129 B2 * 3/2013 Dinan ............... H04W 72/0453
                                                     370/206
(Continued)

FOREIGN PATENT DOCUMENTS

KR    10-2010-0087612 A    5/2010
KR    10-2010-0088690 A    8/2010
(Continued)

*Primary Examiner* — Mark Rinehart
*Assistant Examiner* — Sanjay K Dewan
(74) *Attorney, Agent, or Firm* — Birch, Stewart, Kolasch & Birch, LLP (57) ABSTRACT

Provided is a method and an apparatus for transmitting a random access preamble in a time division duplex (TDD)-based wireless communication system. A wireless device selects an UL subframe in which a random access preamble is to be transmitted in a first serving cell. If the next subframe following the selected UL subframe is a DL subframe and the length of the random access preamble exceeds the UL subframe, the random access preamble may be generated such that the length of the random access preamble may not exceed the UL subframe.

10 Claims, 8 Drawing Sheets

(51) Int. Cl.
  *H04W 74/00* (2009.01)
  *H04W 56/00* (2009.01)
  *H04L 5/00* (2006.01)
(52) U.S. Cl.
  CPC ....... *H04L 5/0007* (2013.01); *H04W 56/0045* (2013.01); *H04W 74/08* (2013.01)

(56) References Cited

U.S. PATENT DOCUMENTS

| | | | | |
|---|---|---|---|---|
| 8,804,772 | B2* | 8/2014 | Dinan | H04W 16/02 370/510 |
| 8,897,180 | B2* | 11/2014 | Choi | H04W 72/0406 370/280 |
| 8,964,590 | B2* | 2/2015 | Dinan | H04W 56/001 370/252 |
| 8,982,741 | B2* | 3/2015 | Sirotkin | H04W 76/048 370/280 |
| 9,014,063 | B2* | 4/2015 | Lee | H04L 1/1861 370/280 |
| 9,042,277 | B2* | 5/2015 | Chen | H04L 5/001 370/280 |
| 9,054,835 | B2* | 6/2015 | Kwon | H04L 5/001 |
| 9,215,678 | B2* | 12/2015 | Dinan | H04W 56/0045 |
| 9,295,039 | B2* | 3/2016 | Han | H04L 1/0028 |
| 2008/0316961 | A1* | 12/2008 | Bertrand | H04W 74/004 370/329 |
| 2009/0046629 | A1* | 2/2009 | Jiang | H04J 13/0059 370/328 |
| 2010/0290370 | A1* | 11/2010 | Li | H04L 5/0007 370/280 |
| 2011/0116364 | A1* | 5/2011 | Zhang | H04W 74/08 370/216 |
| 2011/0286541 | A1 | 11/2011 | Chun et al. | |
| 2012/0307821 | A1 | 12/2012 | Kwon et al. | |
| 2013/0201885 | A1* | 8/2013 | Yang | H04W 72/082 370/280 |
| 2014/0211748 | A1* | 7/2014 | Gunnarsson | H04W 72/02 370/329 |
| 2015/0078219 | A1* | 3/2015 | Li | H04W 74/006 370/278 |
| 2015/0163829 | A1* | 6/2015 | Li | H04W 74/0833 370/329 |
| 2016/0164657 | A1* | 6/2016 | Fan | H04W 74/006 370/280 |

FOREIGN PATENT DOCUMENTS

| | | |
|---|---|---|
| KR | 10-2011-0093632 A | 8/2011 |
| WO | WO 2011/116242 A1 | 9/2011 |
| WO | WO 2012/044082 A1 | 9/2011 |

\* cited by examiner

METHOD FOR TRANSMITTING RANDOM ACCESS PREAMBLE, AND WIRELESS DEVICE

CROSS REFERENCE TO RELATED APPLICATIONS

This application is the National Phase of PCT/KR2013/004087 filed on May 9, 2013, which claims priority under 35 U.S.C. 119(e) to U.S. Provisional Application No. 61/645,026 filed on May 9, 2012, all of which are hereby expressly incorporated by reference into the present application.

BACKGROUND OF THE INVENTION

Field of the Invention

The present invention relates to wireless communications, and more particularly, to a method of transmitting a random access preamble in a time division duplex (TDD)-based wireless communication system, and a wireless device using the method.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

In a time division duplex (TDD) system, a user equipment (UE) performs uplink (UL) transmission and downlink (DL) reception in one frequency band. When it is said that the UE supports a half duplex operation, it implies that UL transmission and DL reception are both possible, but only one of the UL transmission and the DL reception can be performed at one time. If the half duplex operation of the UE is guaranteed, an interference between a UL transmission signal and a DL reception signal can be avoided, and a burden of using a full duplex module which is relatively expensive can be decreased.

Recently, multiple serving cells are introduced to provide a higher data rate. In the TDD system, DL/UL configurations may be configured differently between the multiple serving cells, and the UE may receive a service provided from the multiple serving cells.

However, since various DL/UL configurations are configured, there may be a need to restrict UL transmission as to a UE supporting a half-duplex operation.

SUMMARY OF THE INVENTION

The present invention provides a method and apparatus for transmitting a random access preamble in a time division duplex (TDD)-based wireless communication system.

In an aspect, a method for transmitting a random access preamble in a time division duplex (TDD)-based wireless communication system is provided. The method includes configuring, by a wireless device, a first serving cell to which a first uplink (UL)-downlink (DL) configuration is applied and a second serving cell to which a second UL-DL configuration is applied, selecting, by the wireless device, a UL subframe in which the random access preamble is to be transmitted in the first serving cell, if at least one of a next subframe of the selected UL subframe in the first serving cell and a subframe of the second serving cell is a DL subframe and if a length of the random access preamble exceeds a range of the UL subframe, generating the random access preamble within the range of the UL subframe, and transmitting, by the wireless device, the generated random access preamble in the UL subframe of the first serving cell.

The first UL-DL configuration and the second UL-DL configuration may be different from each other.

If one of the next subframe of the selected UL subframe in the first serving cell and the subframe of the second serving cell is a DL subframe, a remaining subframe may be a UL subframe.

If one of the next subframe of the selected UL subframe in the first serving cell and the subframe of the second serving cell is a DL subframe, a remaining subframe may also be a DL subframe.

In another aspect, a device in a time division duplex (TDD)-based wireless communication system is provided. The device includes a radio frequency (RF) unit configured to transmit a random access preamble, a processor, and a memory operatively coupled to the processor and storing an instruction that when executed by the processor cause the device to configure a first serving cell to which a first uplink (UL)-downlink (DL) configuration is applied and a second serving cell to which a second UL-DL configuration is applied, select a UL subframe in which the random access preamble is to be transmitted in the first serving cell, if at least one of a next subframe of the selected UL subframe in the first serving cell and a subframe of the second serving cell is a DL subframe and if a length of the random access preamble exceeds a range of the UL subframe, generate the random access preamble within the range of the UL subframe, and transmit the generated random access preamble in the UL subframe of the first serving cell.

Even if different time division duplex (TDD) configurations are configured as to multiple cells, a half duplex operation of a wireless device can be guaranteed.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) or 3GPP LTE-advanced (LTE-A). This is for exemplary purposes only, and the present invention is also applicable to various wireless communication systems. In the following description, LTE and/or LTE-A are collectively referred to as LTE.

Figure 1:
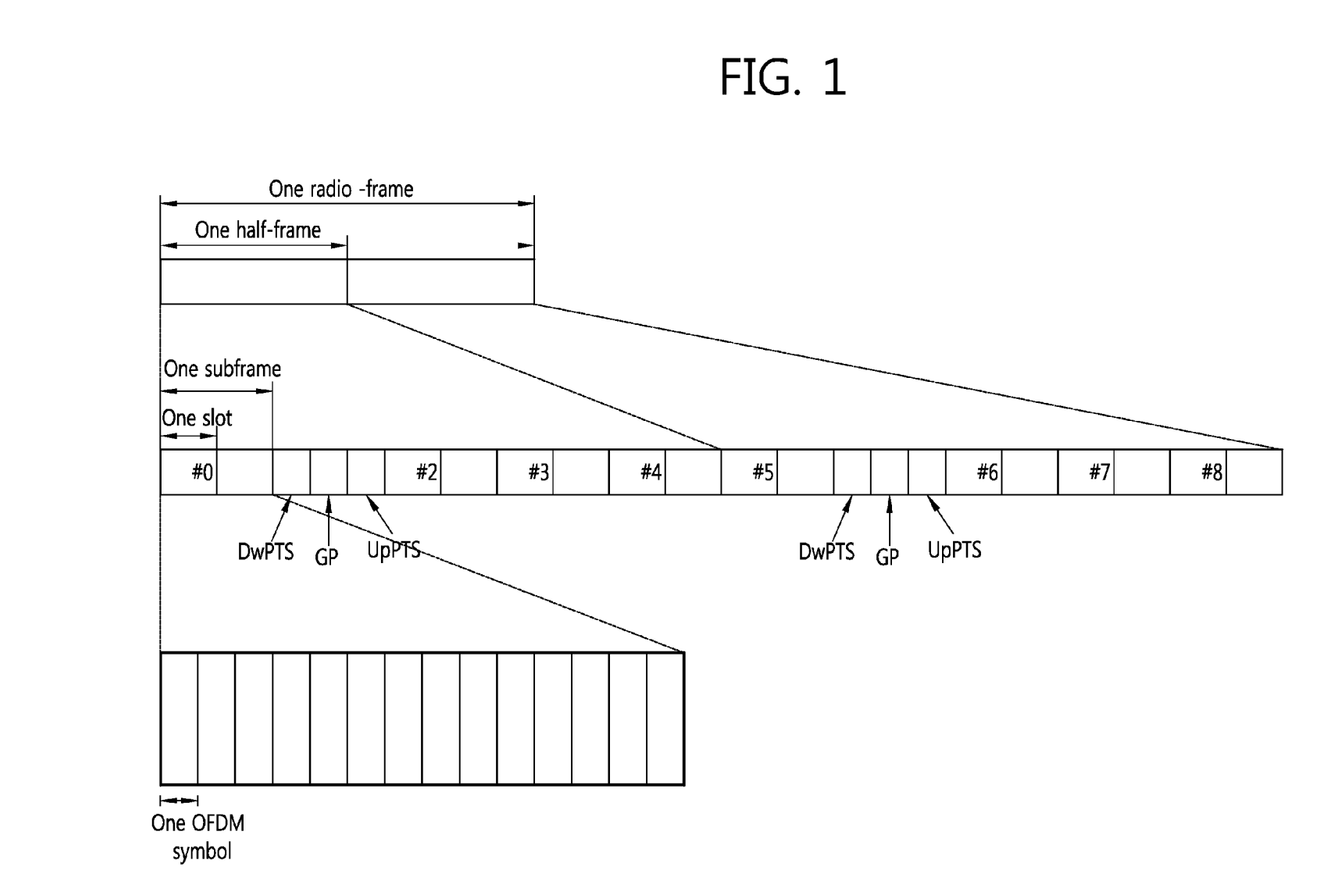
FIG. 1 shows a downlink (DL) radio frame structure in $3^{rd}$ generation partnership project (3GPP) long term evolution (LTE).

FIG. 1 shows a structure of a downlink radio frame in 3GPP LTE. The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

Subframes having ubdexes #1 and #6 are called as special (S) subframes. A S subframe may include a downlink pilot time slot (DwPTS), a guard period (GP) and a uplink pilot time slot (UpPTS). The DwPTs may be used for initial cell search, synchronization and channel estimation. The UpPTS may be used for channel estimation at a BS, uplink synchronization at a wireless device. The GP, also called as a gap, may be a duration to mitigate uplink interference due to multi-path delay of a downlink signal between downlink and uplink.

In TDD, a subframe may be a DL subframe or a UL subframe. Table 1 shows an example of radio frame configuration.

TABLE 1

| UL-DL configuration | Switch-point periodicity | \multicolumn{10}{c}{Subframe index} |||||||||||
|---|---|---|---|---|---|---|---|---|---|---|---|
|  |  | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe and 'S' denotes a S subframe. When a UL-DL configuration is received from a BS, a wireless device can knows which subframe is a DL subframe or a DL subframe in accordance with the UL-DL configuration.

As disclosed in 3GPP TS 36.211 V8.7.0, downlink physical channels include a physical downlink shared channel (PDSCH), a physical downlink control channel (PDCCH), a physical control format indicator channel (PCFICH) and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. The wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

According to 3GPP TS 36.211 V8.7.0, uplink physical channels include a physical uplink shared channel (PUSCH), a physical uplink control channel (PUCCH), a sounding reference signal (SRS) and a physical random access channel (PRACH).

The PUCCH supports multiple formats. A PUCCH having a different number of bits per subframe can be used according to a modulation scheme which is dependent on the PUCCH format. The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

A random access procedure is used by the wireless device to obtain uplink synchronization with a BS and/or to request uplink resources.

Figure 2:
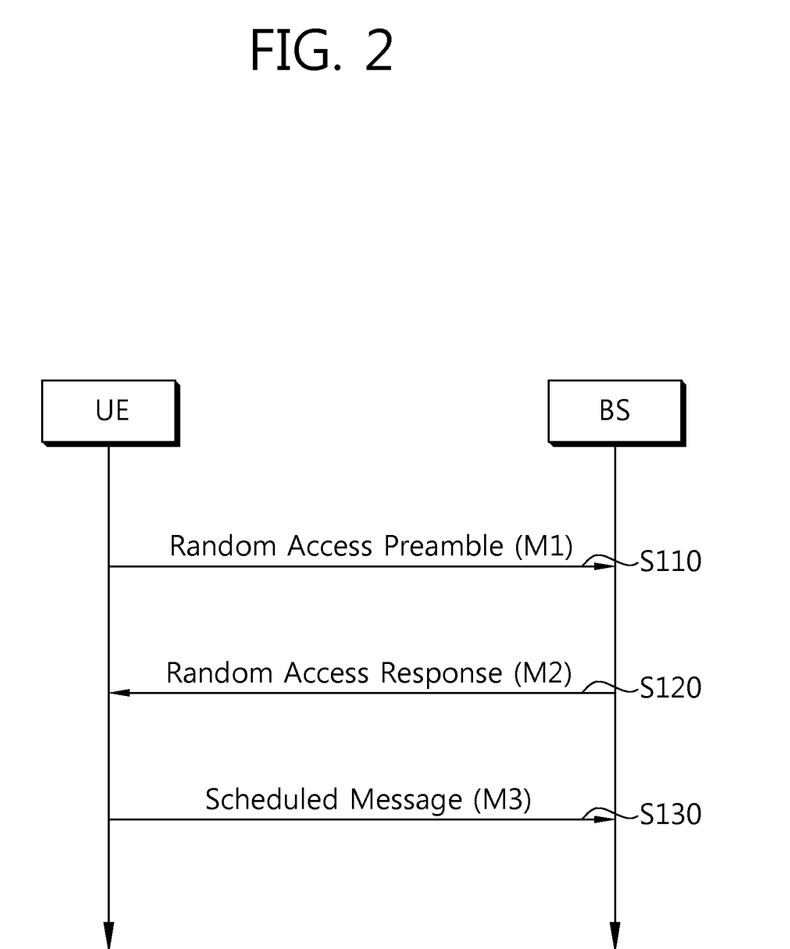
FIG. 2 is a flowchart showing a random access procedure in 3GPP LTE.

FIG. 2 is a flowchart showing a random access procedure in 3GPP LTE.

A wireless device receives a root index and a physical random access channel (PRACH) configuration index from the BS. Each cell has 64 candidate random access preambles defined by a Zadoff-Chu (ZC) sequence. The root index is a logical index for generating the 64 candidate random access preambles by the wireless device.

The random access preamble is limited to a specific time and frequency resource for each cell. The PRACH configuration index indicates a specific subframe and preamble format capable of transmitting the random access preamble.

Table 2 shows examples of random access configurations discloses in section 5.7 of 3GPP TS 36.211 V8.7.0 (2009-05).

TABLE 2

| PRACH configuration index | Preamble format | System frame number | Subframe number |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |

The wireless device transmits a randomly selected random access preamble to the BS (step S110). The wireless device selects one of the 64 candidate random access preambles. In addition, the wireless device selects a corresponding subframe by using the PRACH configuration index. The wireless device transmits the selected random access preamble in the selected subframe.

Upon receiving the random access preamble, the BS transmits a random access response (RAR) to the wireless device (step S120). The RAR is detected in two steps. First, the wireless device detects a PDCCH masked with a random access-RNTI (RA-RNTI). The wireless device receives the RAR included in a medium access control (MAC) protocol data unit (PDU) through a PDSCH indicated by the detected PDCCH.

Figure 3:
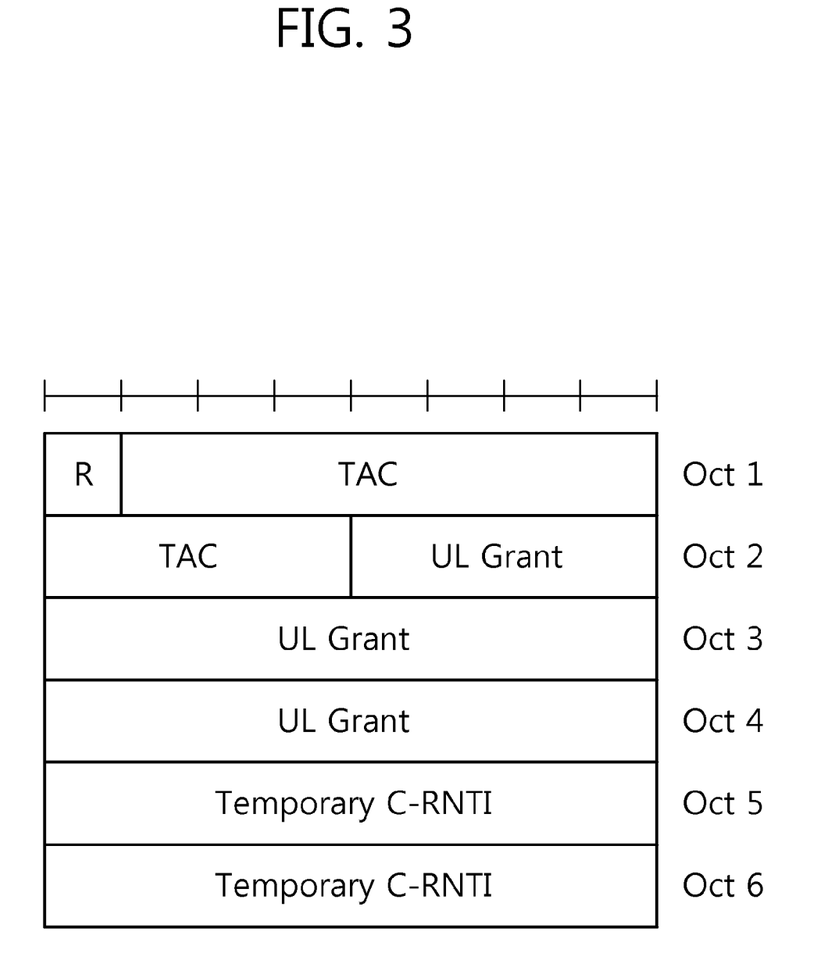
FIG. 3 shows an example of a random access response.

FIG. 3 shows an example of a random access response (RAR).

An RAR may include a TAC, a UL grant, and a temporary C-RNTI.

The TAC is information indicating a time alignment value sent by a BS to a wireless device to maintain a UL time alignment. The wireless device updates UL transmission timing by using the time alignment value. When the wireless device updates the time alignment, a time alignment timer starts or restarts.

The UL grant includes a UL resource assignment and a transmit power command (TPC) used to transmit a scheduling message described below. The TPC is used to determine transmit power for a scheduled PUSCH.

Referring back to FIG. 2, the wireless device transmits a scheduled message to the BS according to a UL grant included in the RAR (step S130).

Meanwhile, the wireless device can support multiple serving cells. One DL component carrier (CC) or a pair of a UL CC and a DL CC can be mapped to one cell. Therefore, when a UE communicates with a BS through multiple DL CCs, it can be said that the UE receives a service from multiple serving cells.

The serving cell may be classified into a primary cell (or pcell) and a secondary cell (or scell). The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after a radio resource control (RRC) connection is established, and may be used to provide an additional radio resource. At least one primary cell is configured always. The secondary cell may be added/modified/released by using higher-layer signaling (e.g., an RRC message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

In the conventional 3GPP LTE, even if the UE supports multiple serving cells, one timing alignment (TA) value is commonly applied to the multiple serving cells. However, a propagation property may change since the multiple serving cells are spaced apart from each other to a great extent in a frequency domain. For example, a remote radio header (RRH) and devices may exist in an area of the BS to extend a coverage or to remove a coverage hole.

In this case, a UL propagation difference appears among multiple cells, and different TA values may be applied to serving cells.

As described above, the half-duplex wireless device cannot simultaneously perform DL reception and UL transmission in one serving cell. The half-duplex wireless device may have a problem in PRACH transmission when the UL propagation difference appears in the multiple serving cells or when various UL-DL configurations are configured.

Figure 4:
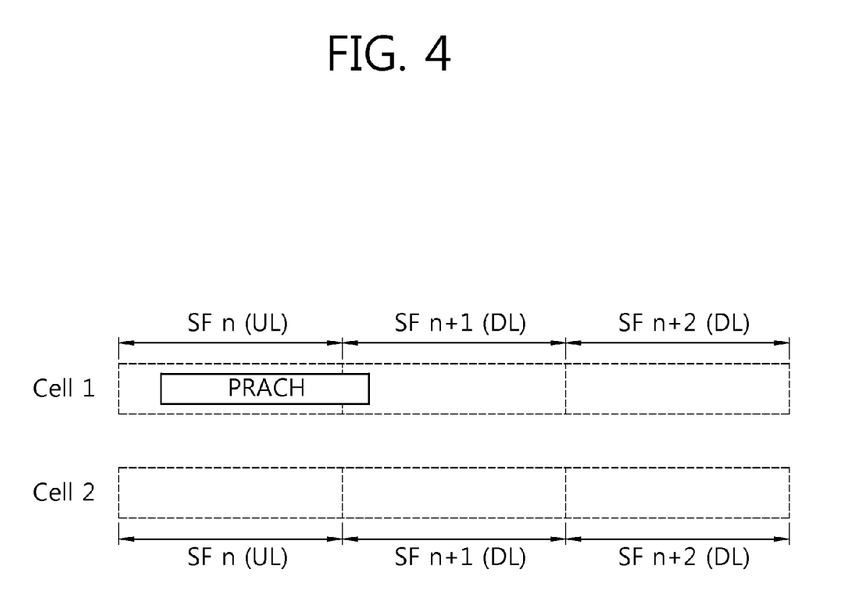
FIG. 4 shows an example of a problem caused by physical random access channel (PRACH) transmission.

FIG. 4 shows an example of a problem caused by PRACH transmission.

A size of one PRACH fits within a range of one subframe. However, when a relatively great TA is applied to a cell 1, the TA is not applied to PRACH transmission, and thus the PRACH occupies up to a DL subframe (SF) n+1, beyond a range of a UL SF n.

Figure 5:
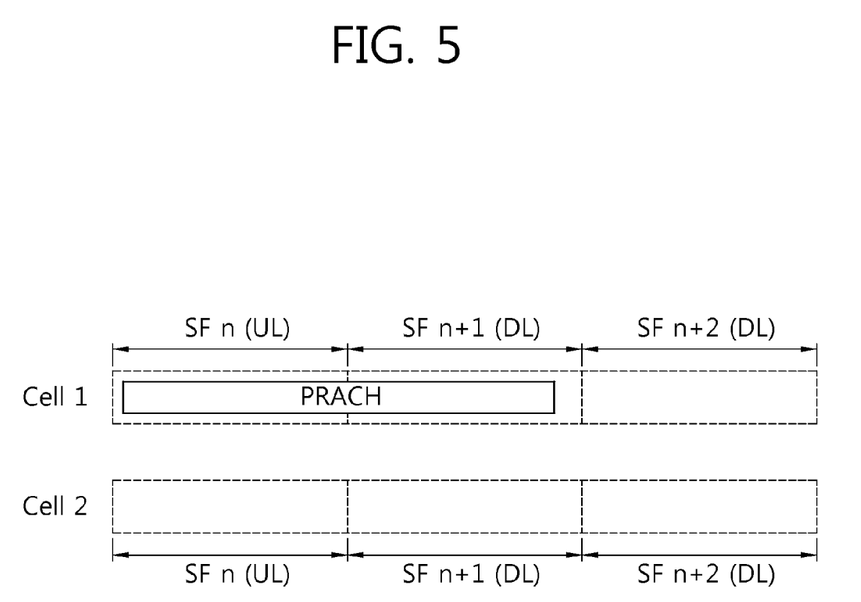
FIG. 5 shows another example of a problem caused by PRACH transmission.

FIG. 5 shows another example of a problem caused by PRACH transmission.

A size of one PRACH is greater than a size of one SF. Therefore, the PRACH must be transmitted across an SF n and an SF n+1. If the SF n+1 is a DL SF, it may be difficult to perform PRACH transmission.

Figure 6:
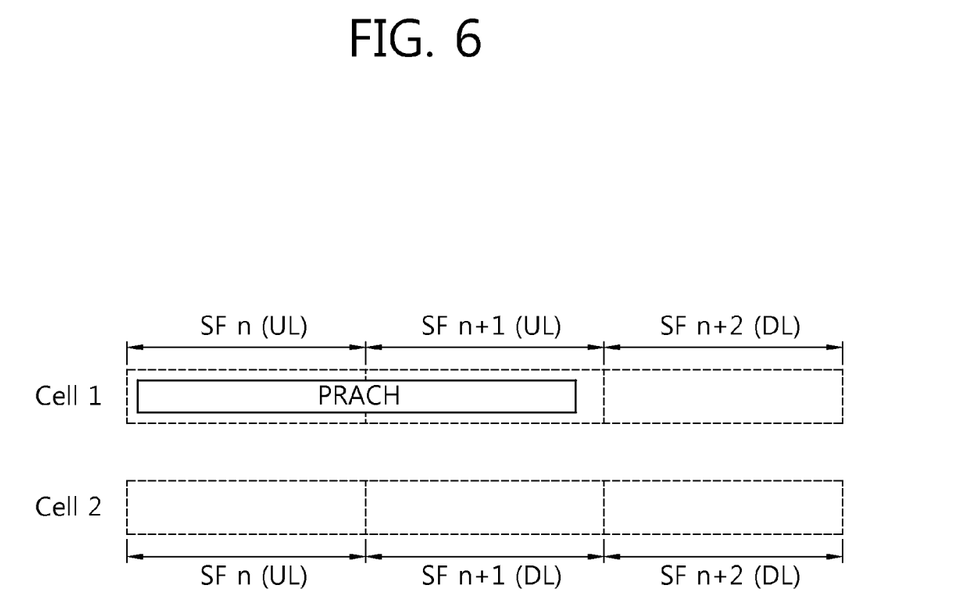
FIG. 6 shows another example of a problem caused by PRACH transmission.

FIG. 6 shows another example of a problem caused by PRACH transmission.

It is assumed that different UL-DL configurations are applied to a cell 1 and a cell 2. It is also assumed that, in the cell 1, an SF n and an SF n+1 are UL SFs, and an SF n+2 is a DL SF. It is also assumed that, in the cell 2, an SF n is a UL SF, and an SF n+1 and an SF n+2 are DL SFs. That is, the SF n+2 is a UL SF in the cell 1 and is a DL SF in the cell 2.

It is assumed that a PRACH is transmitted across the SF n and the SF n+1 of the cell 1.

If only a UL operation of the cell 1 is allowed to a half-duplex wireless device, PRACH transmission has no problem. However, if only a DL operation of the cell 2 is allowed, it may be difficult to perform PRACH transmission in the SF n+1.

Figure 7:
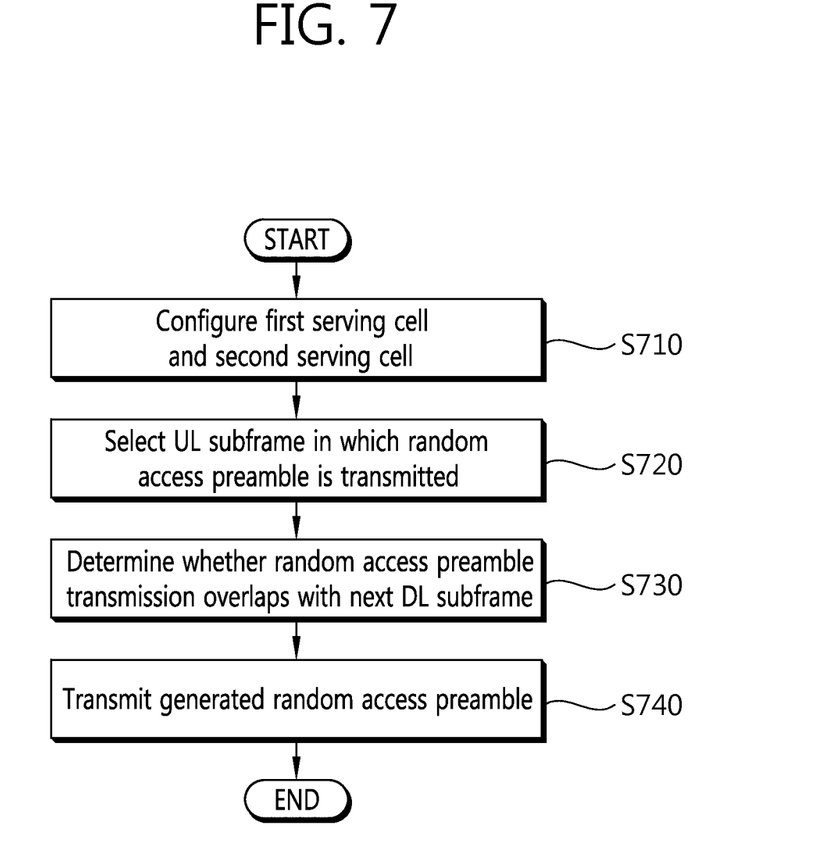
FIG. 7 is a flowchart showing a method of transmitting a random access preamble according to an embodiment of the present invention.

FIG. 7 is a flowchart showing a method of transmitting a random access preamble according to an embodiment of the present invention.

In step S710, a wireless device configures a first serving cell to which a first UL-DL configuration is applied and a second serving cell to which a second UL-DL configuration is applied. The first serving cell may be a primary cell, and the second serving cell may be a secondary cell. Alternatively, the first serving cell may be the secondary cell, and the second serving cell may be the primary cell.

Although it is assumed hereinafter that the random access preamble is generated and transmitted in the first serving cell, it is also possible that the random access preamble is generated and transmitted in the second serving cell.

In step S720, the wireless device selects a UL subframe in which the random access preamble is transmitted. The wireless device may receive a random access configuration in the first serving cell and the second serving cell.

The random access configuration may include information regarding a PRACH access index of Table 2 and a root index for a random access preamble sequence. The wireless device may select the UL subframe on the basis of the random access configuration.

In step S730, it is determined whether transmission of the random access preamble overlaps with a next DL subframe of the selected UL subframe. The wireless device may determine whether a next subframe of the selected UL subframe is a DL subframe (of the first serving cell and/or the second serving cell) and whether a length of the random access preamble exceeds a range of the UL subframe.

As shown in the example of FIG. 6, if the length of the random access preamble exceeds the range of the UL subframe and if the next subframe of the selected UL subframe is a DL subframe corresponding to any one of a subframe of the first serving cell and a subframe of the second serving cell, it may be determined that the transmission of the random access preamble overlaps.

If the transmission of the random access preamble overlaps in the next DL subframe of the selected UL subframe, the following operation is possible.

In a first embodiment, the wireless device may not receive a DL signal (e.g., a PDCCH, a PDSCH, etc.) in a DL subframe in which the transmission of the random access preamble overlaps.

In a second embodiment, the wireless device may give up the transmission of the random access preamble upon discovery of the DL subframe in which the transmission of the random access preamble overlaps.

In a third embodiment, the wireless device may adjust a length of the random access preamble.

The wireless device may transmit a random access preamble having a relatively short length upon discovery of the DL subframe in which the transmission of the random access preamble overlaps.

For example, if $T_{cp}$ denotes a length of a CP part of the random access preamble and $T_{SEQ}$ denotes a length of a sequence part, four types of preamble formats are provided as follows.

TABLE 3

| Preamble format | $T_{CP}$ | $T_{SEQ}$ |
| --- | --- | --- |
| 0 | 3168 Ts | 24576 Ts |
| 1 | 21024 Ts | 24576 Ts |
| 2 | 6240 Ts | 2 · 24576 Ts |
| 3 | 21024 Ts | 2 · 24576 Ts |
| 4 | 448 Ts | 4096 Ts |

Ts is a basic unit. For example, Ts = 1/(1500 × 2048).

For example, it is assumed that preamble formats 0/4 can be transmitted in one subframe, whereas preamble formats 1/2/3 are transmitted in two subframes exceeding a range of one subframe.

Upon discovery of an overlapping DL subframe, even if the wireless device is currently configured to use the preamble format 1, the wireless device may use the preamble formats 0/4 so that preamble transmission is performed within a range of a UL subframe. Whether to use the preamble format 0 or the preamble format 4 may be reported by a BS to the wireless device.

Alternatively, the wireless device may adjust a sequence length of the random access preamble.

The random access preamble may be defined by a Zadoff-Chu (ZC) sequence as follows.

$$x(n) = e^{-\frac{\pi k n(n+1)}{N}} \quad \text{[Equation 1]}$$

Herein, k denotes a root index, and N denotes a length of the sequence, where $0 \leq n \leq (N-1)$.

It is assumed that N=839 in a normal state, and preamble transmission is performed across two subframes. Upon discovery of an overlapping DL subframe, a preamble having a much shorter length may be generated by adjusting the length N. For example, N may be set to a prime number less than 839. Information regarding the adjusted value N may be reported by the BS to the wireless device.

In step S740, the wireless device transmits the random access preamble upon generation of the random access preamble.

Even if different UL-DL configurations are configured in multiple serving cells, the wireless device may perform the random access procedure while supporting a half-duplex operation.

Figure 8:
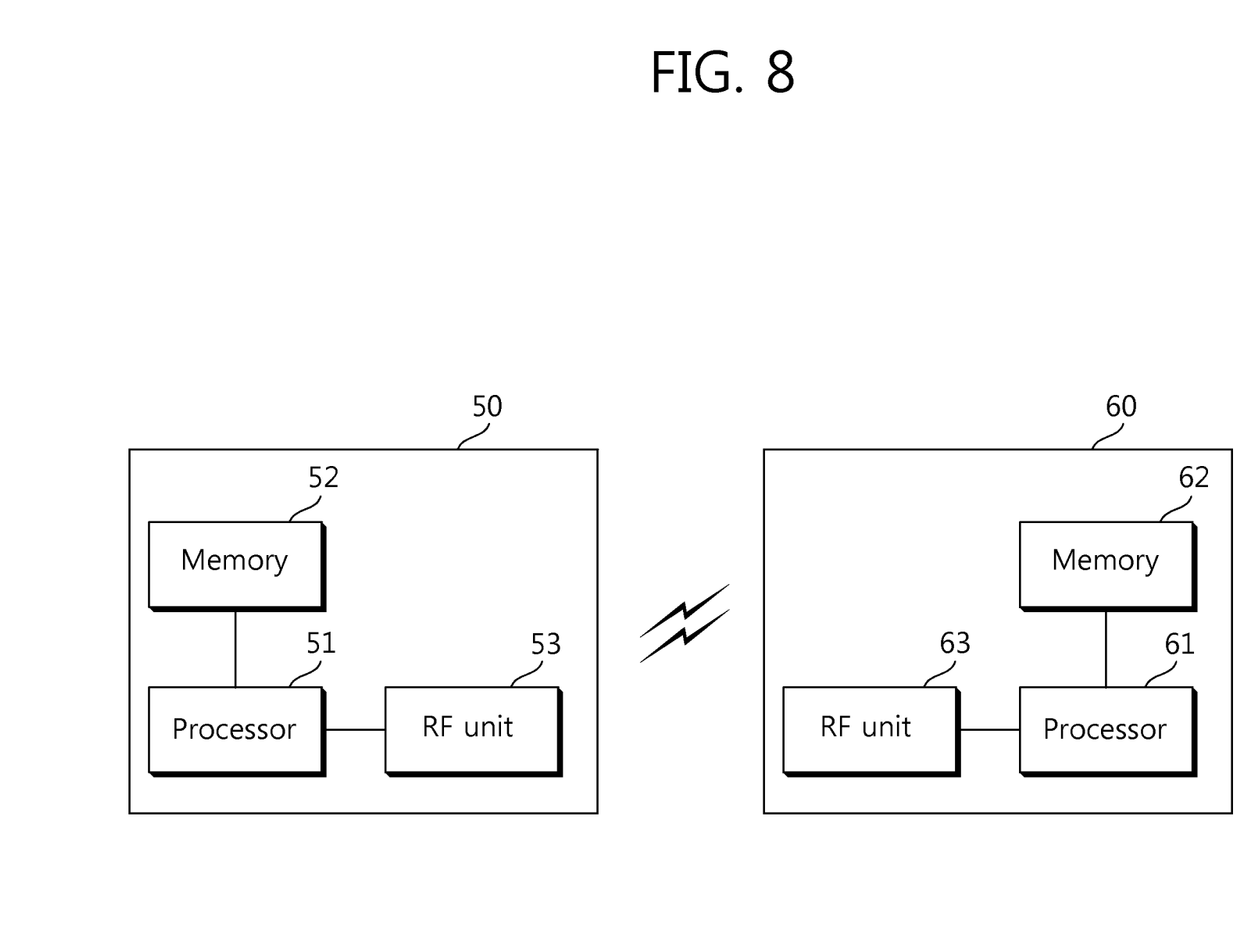
FIG. 8 is a block diagram showing a wireless communication system according to an embodiment of the present invention.

FIG. 8 is a block diagram showing a wireless communication system according to an embodiment of the present invention.

A BS 50 includes a processor 51, a memory 52, and a radio frequency (RF) unit 53. The memory 52 is coupled to the processor 51, and stores an instruction executed by the processor 51. The RF unit 53 is coupled to the processor 51, and transmits and/or receives a radio signal. The processor 51 implements the proposed functions, procedures, and/or methods. In the aforementioned embodiment, an operation of the BS may be stored in the memory 52 by the instructions, and may be executed by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be stored in the memory 52 by the instructions, and may be executed by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a random access preamble in a time division duplex (TDD)-based wireless communication system, the method comprising:
    configuring, by a wireless device, a first serving cell to which a first uplink (UL)-downlink (DL) configuration is applied and a second serving cell to which a second UL-DL configuration is applied;
    selecting, by the wireless device, a UL subframe in which the random access preamble is to be transmitted in the first serving cell;
    if at least one of a next subframe of the selected UL subframe in the first serving cell and a subframe of the second serving cell is a DL subframe, and if a length of the random access preamble exceeds a range of the selected UL subframe, generating, by the wireless device, the random access preamble within the range of the selected UL subframe; and
    transmitting, by the wireless device, the generated random access preamble in the selected UL subframe of the first serving cell,
    wherein the random access preamble is generated by a sequence of:

$$x(n) = e^{-\frac{\pi k n(n+1)}{N}},$$

where k is a root index, N is a length of the sequence, and $0 \leq n \leq (N-1)$.

2. The method of claim 1, wherein the first UL-DL configuration and the second UL-DL configuration are different from each other.

3. The method of claim 2, wherein if one of the next subframe of the selected UL subframe in the first serving cell and the subframe of the second serving cell is a DL subframe, a remaining subframe is a UL subframe.

4. The method of claim 2, wherein if one of the next subframe of the selected UL subframe in the first serving cell and the subframe of the second serving cell is a DL subframe, a remaining subframe is also a DL subframe.

5. The method of claim 1, wherein the first serving cell is a primary cell, and the second serving cell is a secondary cell.

6. The method of claim 1, wherein the first serving cell is a secondary cell, and the second serving cell is a primary cell.

7. The method of claim 1, wherein N is a prime number less than 839.

8. A device in a time division duplex (TDD)-based wireless communication system, the device comprising:
    a radio frequency (RF) unit configured to transmit a random access preamble;
    a processor operably coupled with the RF unit; and
    a memory operatively coupled to the processor and configured to store an instruction that, when executed by the processor, causes the device to:
    configure a first serving cell to which a first uplink (UL)-downlink (DL) configuration is applied and a second serving cell to which a second UL-DL configuration is applied;
    select a UL subframe in which the random access preamble is to be transmitted in the first serving cell;
    if at least one of a next subframe of the selected UL subframe in the first serving cell and a subframe of the second serving cell is a DL subframe and if a length of the random access preamble exceeds a range of the selected UL subframe, generate the random access preamble within the range of the selected UL subframe; and
    transmit the generated random access preamble in the selected UL subframe of the first serving cell,
    wherein the random access preamble is generated by a sequence of:

$$x(n) = e^{-\frac{\pi k n(n+1)}{N}},$$

where k is a root index, N is a length of the sequence, and $0 \leq n \leq (N-1)$.

9. The device of claim 8, wherein the first UL-DL configuration and the second UL-DL configuration are different from each other.

10. The device of claim 9, wherein if one of the next subframe of the selected UL subframe in the first serving cell and the subframe of the second serving cell is a DL subframe, a remaining subframe is a UL subframe.

* * * * *